United States Patent [19]

Miller

[11] Patent Number: 5,582,555
[45] Date of Patent: Dec. 10, 1996

[54] CONTINUOUSLY VARIABLE TRANSMISSION

[76] Inventor: Dennis J. Miller, 4190 Wilkinson Rd., Gaylord, Mich. 49735

[21] Appl. No.: 523,222

[22] Filed: Sep. 5, 1995

[51] Int. Cl.⁶ .......................... F16H 55/54; F16H 55/30; F16H 9/10
[52] U.S. Cl. ................ 474/49; 474/57; 474/148
[58] Field of Search .................. 474/49, 50, 53, 474/57, 148

[56] References Cited

U.S. PATENT DOCUMENTS

| | | | |
|---|---|---|---|
| 663,928 | 12/1900 | Pratt | 474/57 |
| 1,254,261 | 1/1918 | Muller | 474/57 |
| 2,552,179 | 5/1951 | Kamp | 474/53 |
| 3,969,948 | 7/1976 | Pipenhagen, Jr. | 74/244 |
| 4,342,559 | 8/1982 | Williams | 474/50 |
| 4,373,926 | 2/1983 | Fullerton | 474/57 |
| 4,642,070 | 2/1987 | Walker | 474/57 |
| 4,781,663 | 11/1988 | Reswick | 474/49 |
| 4,892,507 | 1/1990 | Patin et al. | 474/50 |
| 4,990,123 | 2/1991 | Krude | 474/50 |

*Primary Examiner*—Stephen J. Novosad

[57] ABSTRACT

An infinitely variable ratio drive mechanism consisting of at least one variable diameter pulley and a flexible drive belt. A plurality of pulley segments are connected via links to a hub, such that their concerted arcs of motion describe a variable pulley diameter, the segments being biased one to another by resilient force. When two pulleys operate together, the effective diameters of both are adjusted in like direction. The drive pulley diameter is the resultant of a balance between the drive belt force exerted on the individual segments and the opposing resilient force. The plurality of belt engaging members describing the driven pulley adjust opposite the first, their position being actuated in the direction of belt force and restricted by belt length.

14 Claims, 6 Drawing Sheets

5,582,555

CONTINUOUSLY VARIABLE TRANSMISSION

BACKGROUND

1. Field of Invention

This invention relates to variable drive ratio endless belt power transmission systems, specifically to pulley systems with expansible rim means adjustable in response to load requirements.

2. Description of Prior Art

Variable ratio belt drive power transmission systems utilizing expansible pulleys to provide variable pitch diameters on drive and driven elements are well known. Heretofore, most development effort has been invested in expansible cone pulleys and they are in wide use. Typically, these systems utilize axially adjustable pulley faces and control means to adjust the distance between faces, thereby changing the diameter at which a V-belt, normally, will traverse the pulley.

Those experienced in the art understand the limitations of such mechanisms. Although they have been developed to be reliable and efficient, their use has been restricted from the very low cost and size limited applications. As an example, the bicycle can be considered among the most critical of applications for a variable speed drive when cost, size, and weight limitations are considered. To date, there is no commercially viable, automatically adjustable, infinitely variable speed drive for the bicycle.

Attempts to develop an automatic transmission for the bicycle are many and varied, although none have displaced the existing manual shifting means. In U.S. Pat. No. 4,342,559, dated Aug. 3, 1982, Williams teaches the use of plates with guide grooves to control the radial position of pulley or sprocket segments and accomplish drive ratio variations. The pulley segments must slide freely between the control plates without jamming. Such systems are complicated and, hence, have proven too costly to impact the present market. Should they be developed to be cost competitive, the grooved guides can be expected to decrease durability and degrade performance. The added weight of the plates and related guide mechanisms is, likewise, a major detraction to these systems. They are also limited in the ability to be customized for a wide range of end users in one configuration.

In U.S. Pat. No. 4,642,070, dated Feb. 10, 1987, Walker utilizes toothed means to control the location of sprocket segments. As described, only the drive member changes diameter. Therefore, it must change by a large percentage in order to facilitate the range of drive ratios required for comfortable bicycle operation. Such a diametrical change would require very sturdy construction and its associated cost and weight. Also, a separate chain take up is required, again with extra cost and weight.

Thus, the above mentioned inventions have not been able to compete with the present manual shifting means in simplicity of operation, cost and weight. In addition to excessive cost and weight, they cannot be customized for a wide range of users. Durability is also seriously degraded as these complex systems are downsized to provide an adequate drive ratio range while meeting size and weight constraints.

SUMMARY OF THE INVENTION

In accordance with the preferred embodiment of the present invention, the transmission is constructed such that drive power is applied to a first pulley assembly including pulley segments linked to a center hub and resiliently linked to each other. This pulley is coupled via a V-belt to a second pulley of similar construction to the first.

Central to the design are resiliently biased slider links between pulley segments that are set for the desired input torque resistance. These members allow a drive pulley to collapse in a uniform manner as they are overcome by drive torque as load, transmitted by drive belt tension, increases. In doing so, input speed and torque are maintained over varying load conditions.

Conversely, drive belt tension exerts a continuous force on driven pulley segments in the direction of increased diameter. However, as belt length is constant, the driven pulley segments are allowed to open only as the drive pulley decreases in diameter. Thus are output speed and torque adjusted according to load.

Accordingly, several objects and advantages of the present invention are:

(a) to provide a variable pitch drive that automatically adjusts ratios based on applied load, while minimizing any variation in drive torque.

(b) to provide a variable pitch drive with easily adjusted torque adjusting spring forces to facilitate customized configurations to meet individual requirements.

(c) to provide a variable pitch drive which is simple in design and operation and, therefore, low in manufacturing and maintenance costs.

(d) to provide a variable pitch drive which, because most adjustment is by linkage movement, will prove durable under a wide range of operating conditions.

(e) to provide a variable pitch drive capable of meeting or exceeding the size and weight constraints of bicycle applications.

Further objects and advantages of my invention will become apparent from a consideration of the ensuing drawings and description.

DETAILED DESCRIPTION OF THE PREFERRED EMBODIMENT

Figure 1:
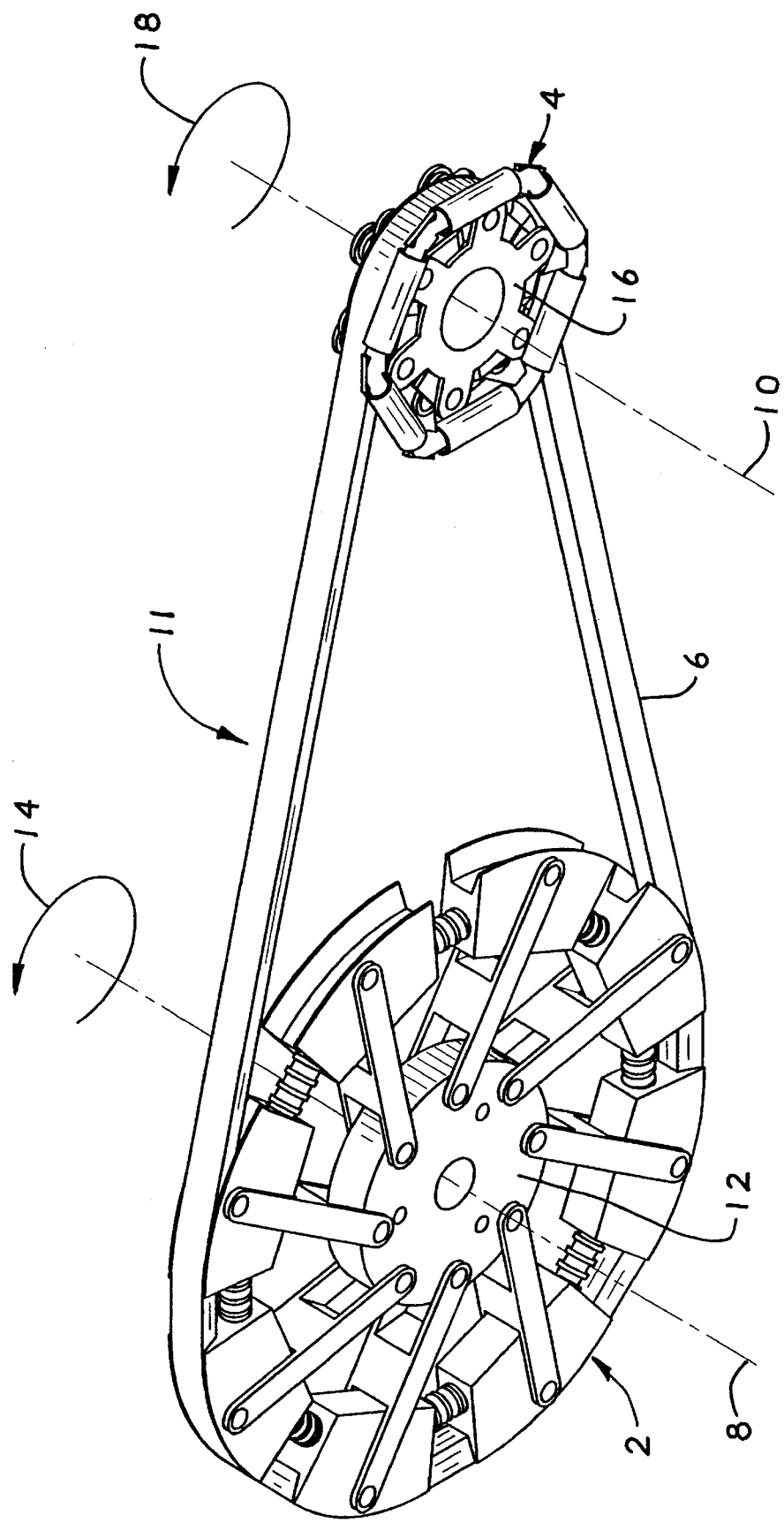
FIG. 1 is a perspective view of a transmission in an operating condition relating to high speed.

FIG. 1 illustrates one embodiment of the present invention. As shown, a drive pulley 2 is connected to a driven pulley 4 by endless power transmission means, in this case, V-belt 6. The drive pulley is mounted via radial bearing means as known to those experienced in the art, on rigid axis 8. Driven pulley 4 is mounted via radial bearing means on rigid axis 10, parallel to axis 8.

Transmission system 11 is shown in its relaxed position. Driven pulley 4 is fully collapsed while drive pulley 2 is fully extended, as limited by the length of V-belt 6. Power is applied to the drive pulley through a hub 12 in the direction of arrow 14. Power is output from the driven pulley through a hub 16 in the direction of arrow 18. The pulley conditions shown relate to high speed.

Figure 2:
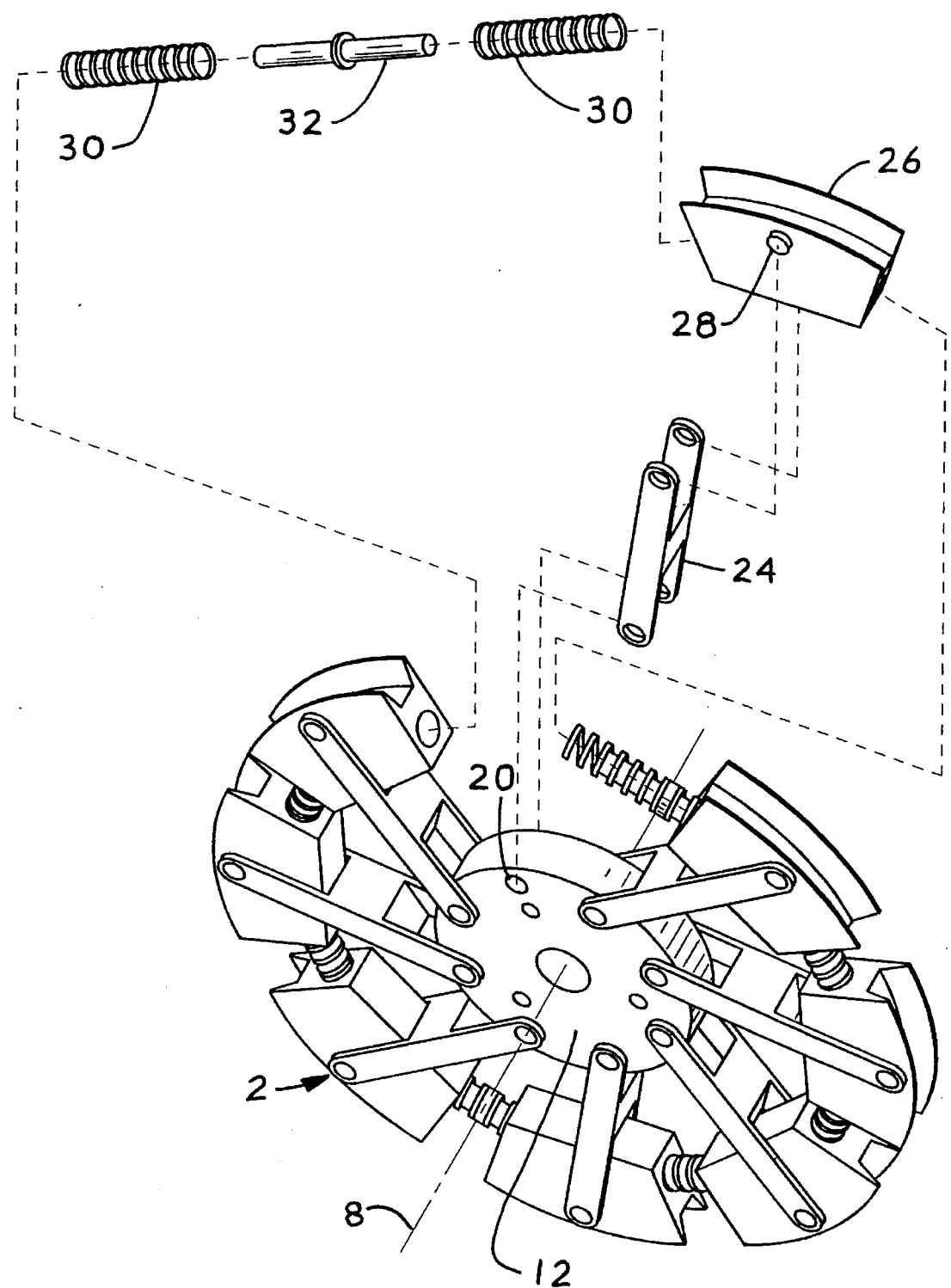
FIG. 2 is a partially exploded perspective view of a typical pulley.

As seen in FIG. 2, drive pulley 2 comprises hub 12 which rotates about axis 8. Attached to and free to pivot relative to hub 12 at a pivot joint 20 is a linkage means consisting of a plurality of links 24. Each link is connected to a belt engaging member shown as pulley segment 26, also via a pivot joint 28. Pivot joints are understood to be well known to those experienced in the art. Each pulley segment is connected to an adjacent segment on either side by a resiliently biasing means, in this drawing described as coil springs 30 and guide 32. On the radially outward face of each pulley segment is an integrally formed V-belt groove.

Pivot 28 should nearly centered on the pitch line of the V-belt groove in pulley segment 26. This will minimize any net moment imparted by the forces balanced about the pulley segment and the distance between them. A moment will result from a distance between the application point of belt tension and pivot 28 as it transmits drive force.

Springs 30 and spring guides 32 serve to keep the pulley segment in its proper orientation in this embodiment. Clearances should be such that the spring mechanism and pulley segment act as a slider link. Then, as the pulley collapses and expands, the V-belt groove will maintain its orientation, facing radially outward. It is desirable for optimum performance to keep each pulley segment oriented such that it will maintain maximum contact with the V-belt. The spring placement is intended to ensure that the plurality of pulley segments move in concert as much as possible in response to varying load.

Figure 3:
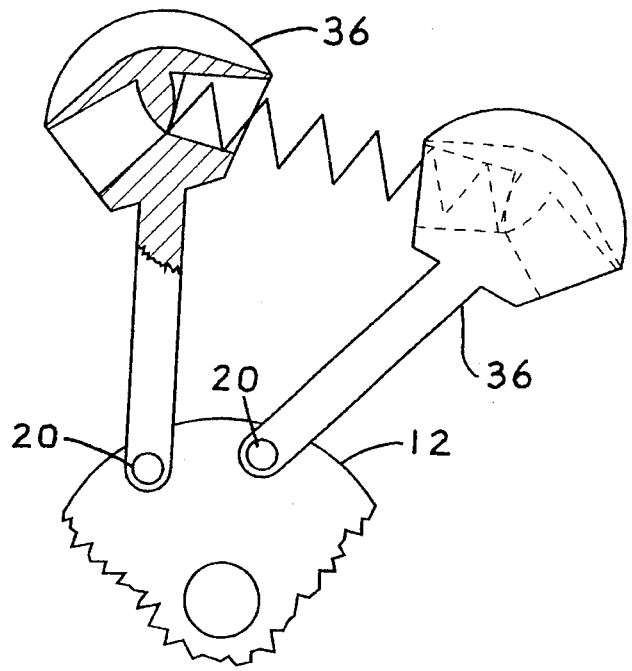
FIG. 3 is a partially sectioned front view illustrating an alternate embodiment of a pulley linkage configuration.

Pivot joint 28 may not be required in alternate embodiments and may be omitted. FIG. 3 shows a linkage arrangement wherein the linkage means is only pivot joint 20 between a pulley segment 36 and hub 12. The plurality of pulley segments may not need to have maximum pulley to drive belt contact area. This is especially true in low power applications. The pulley segments may be shaped such that they make adequate, though not total, contact with the drive belt in all positions. As such, performance and complexity can be balanced for the particular application.

Figure 4:
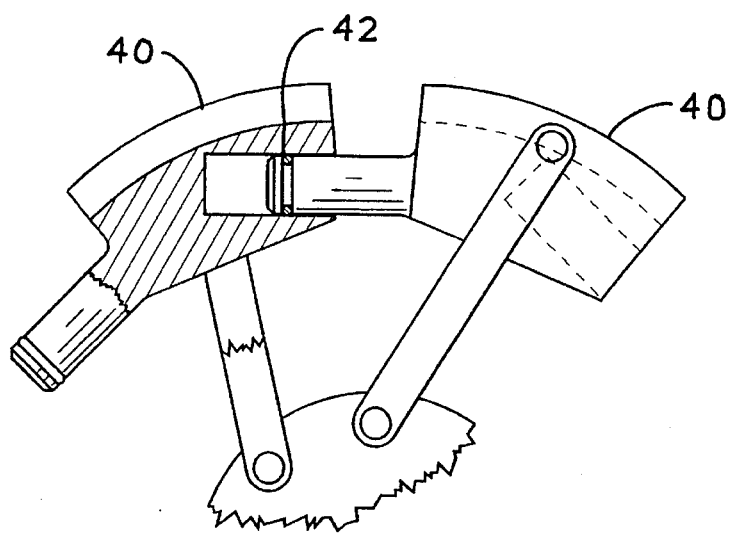
FIG. 4 is a partially sectioned front view showing a partial pulley assembly wherein the pulley segments nest into each other in a piston and cylinder arrangement.

An alternate embodiment is illustrated in FIG. 4. As shown, the interface between pulley segments 40 is sealed, thereby utilizing the resiliency of the entrapped gas. Integral to each pulley segment is a formed piston sealed to the mating pulley segment by seal 42. The piston arrangement can be used alone or in conjunction with mechanical springs to provide the required spring forces.

This configuration is advantageous as the air pressure can be easily adjusted by means currently available to those experienced in the art. A pulley arrangement can be made which will allow the end user to easily customize the transmission by merely releasing entrapped air or injecting additional air.

Figure 5:
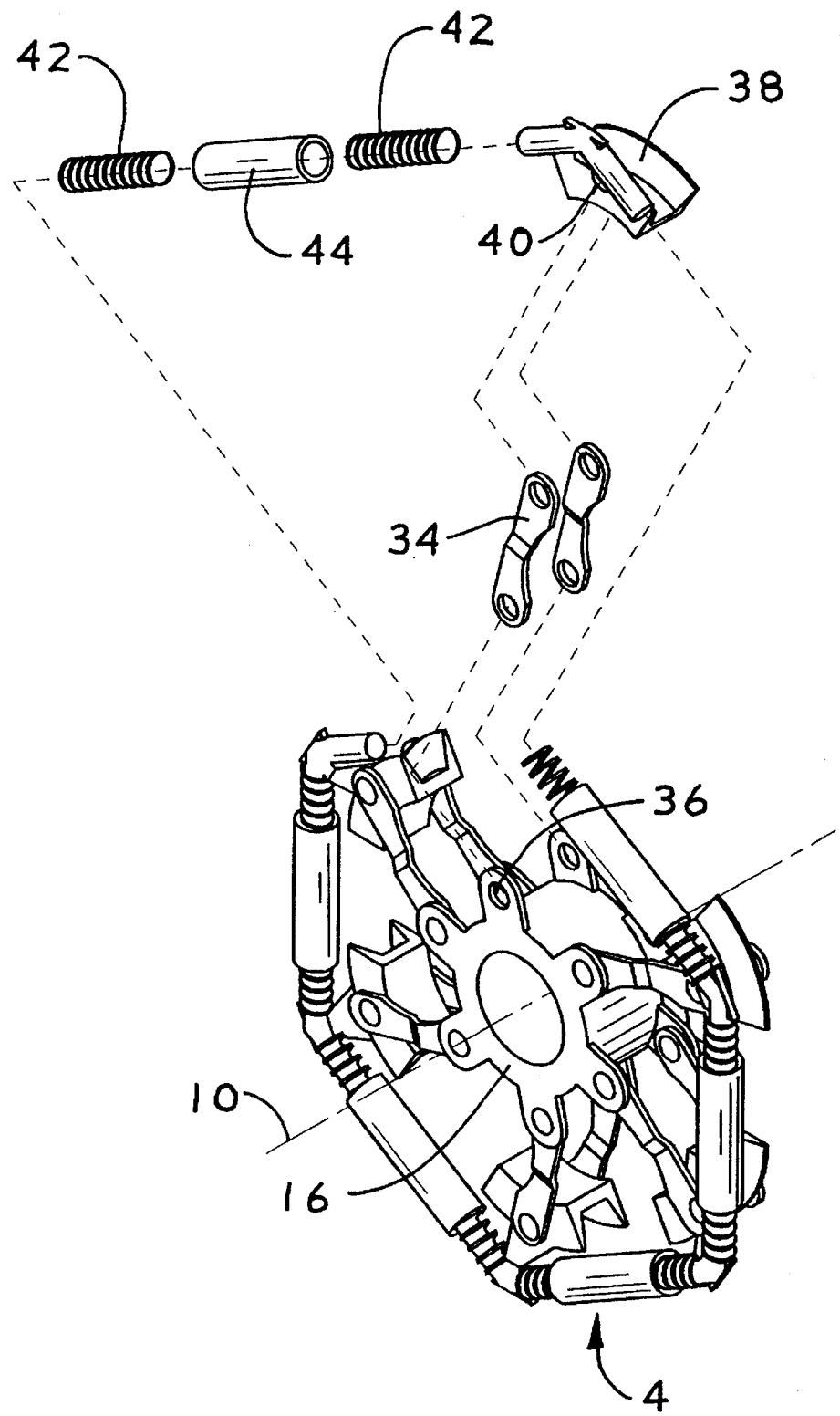
FIG. 5 is a partially exploded perspective view of an alternate pulley arrangement.

Referring to FIG. 5, driven pulley assembly 4 is similar in concept to the drive pulley described in FIG. 2. This assembly consists of hub 16 which transmits power about axis 10. Attached to the hub are a plurality of links 34, each at a pivot joint 36. Each link 34 is also attached to a pulley segment 38 at a pivot joint 40. Due to size limitations in this embodiment a plurality of coil springs 42 and guides 44 are placed radially outward from the V-belt grooves of pulley segments 38. This allows for longer return springs 42 to be utilized which is desirable for this invention as will be discussed in detail in the operation section. Return springs in this pulley will typically be considerably lower in spring rate than those in the drive pulley.

Figure 6:
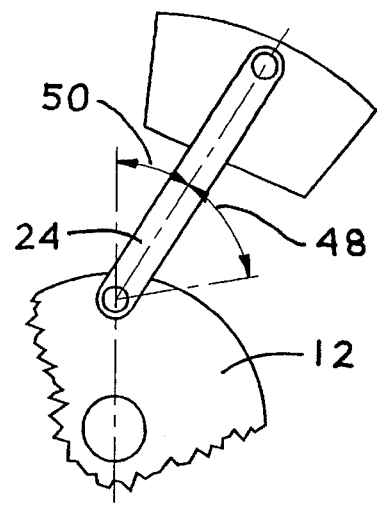
FIG. 6 is a front view of a pulley linkage subassembly in a fully opened operating condition.

FIG. 6 shows a typical linkage subassembly of a drive or driven pulley and its path of movement. Link 24 is free to rotate about hub 12 through an angle 48. A greater angle 48 provides for a greater variation in pulley diameter. Angle 50 describes the maximum extension of link 24. In this embodiment angle 50 should be maintained above zero degrees to ensure that link movement in a direction of decreasing angle 48 always results in a reduction in pulley diameter.

Figure 7:
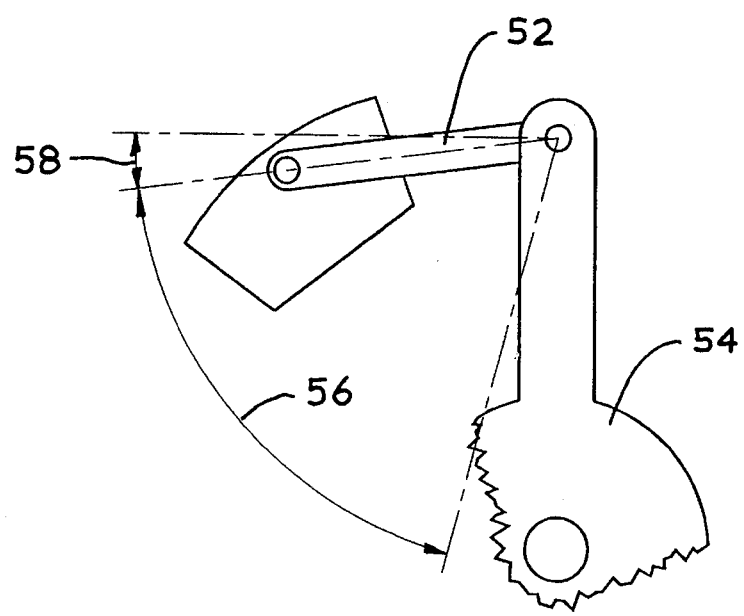
FIG. 7 is a front view of an alternate pulley linkage subassembly in a fully opened operating condition.

FIG. 7 illustrates an alternate linkage embodiment for a drive or driven pulley. In this instance, a link 52 and a hub 54 are positioned in an alternate orientation. Link 52 is free to rotate about hub 54 through an angle 56. A greater angle 56 provides for a greater variation in pulley diameter. Angle 58 describes the maximum extension of link 52. In this embodiment angle 58 should be maintained above zero degrees to ensure that link movement in a direction of increasing angle 56 always results in an increase in pulley diameter.

Should special conditions warrant, the driven pulley may be of a fixed diameter with separate belt slack take-up means provided or other pulley designs with expansible rim means. Such arrangements can be construed as modifications useful under different circumstances and can be considered further embodiments of the disclosed invention.

OPERATION

Figure 8:
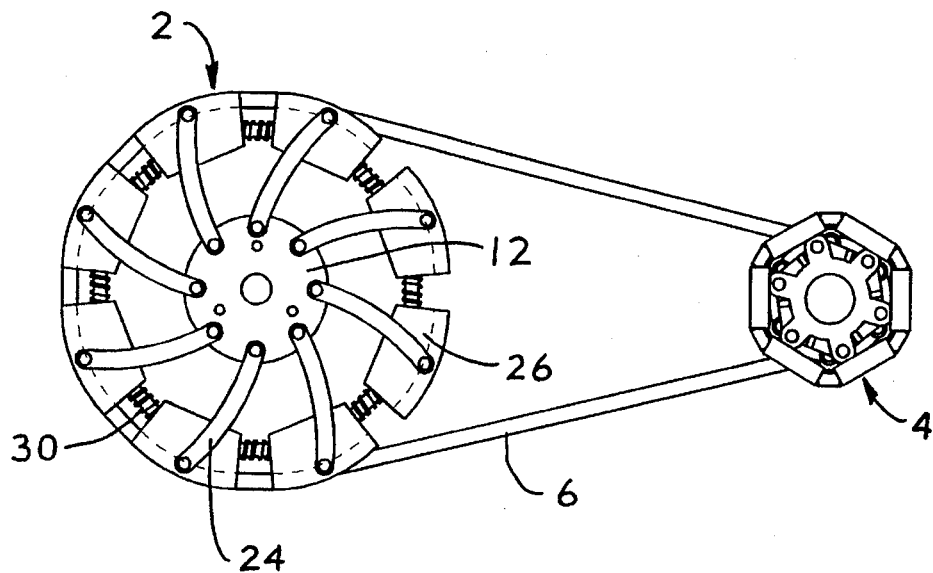
FIG. 8 is a front view of a transmission in an operating condition relating to high speed.

FIG. 8 shows the invention in its lowest energy position. Springs 30 in the drive pulley develop a higher spring force in this, the extended configuration, than the springs in the collapsed driven pulley. This causes the drive pulley to seek the fully extended position. V-belt 6 length is a constant, and is sized such that driven pulley 4 is forced to be fully collapsed.

As load on driven pulley 4 increases from rest, tension in V-belt 6 will increase and, therefore, input torque must increase. When V-belt tension exceeds the spring force developed by the drive pulley, links 24 will begin to pivot about hub 12 in a clockwise direction, compressing springs 30 until belt tension is balanced by spring force. As each link rotates in a clockwise direction, pulley segments 26 move circumferentially and radially inward to decrease the effective diameter of drive pulley 2.

As drive pulley 2 decreases in diameter and V-belt length remains constant, driven pulley 4 will be allowed to expand. Belt tension on the pulley segments added to the spring force result in a net force with a counterclockwise direction. These forces will expand the driven pulley as much as the V-belt will allow.

Figure 9:
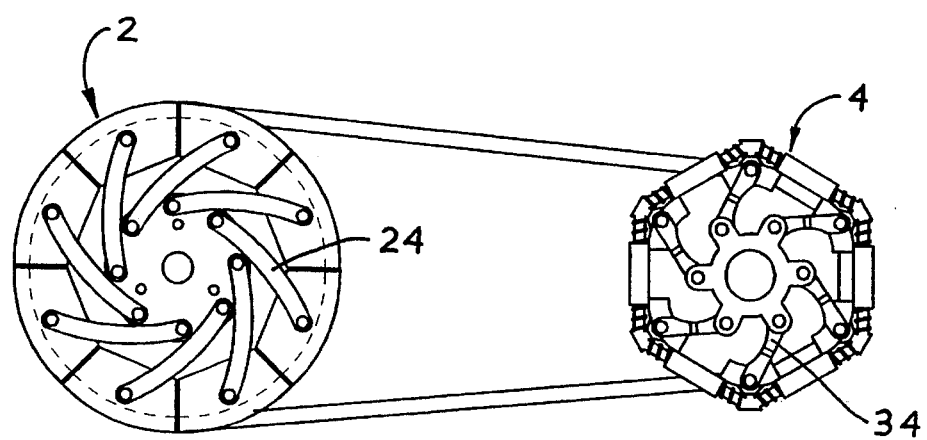
FIG. 9 is a side view of a transmission in an operating condition relating to low speed.

The transmission described herein will reach equilibrium at any time that input power is equal to output power, until it reaches its highest energy state shown in FIG. 9. At such equilibrium position, V-belt tension is directly related to the diameter described by the driven pulley. The effective diameter of the drive pulley is inversely related to belt tension.

Limits of travel may be imparted to the pulleys by means of positive stops and V-belt length. Drive pulley 2 and driven pulley 4 should not be allowed to have links 24 and 34, respectively, travel past an angle 50 of zero as shown in FIG. 6.

It is desirable that input torque, as the transmission operates in the speed range shown in FIG. 8, be as close as possible, without exceeding, input torque in the speed range shown in FIG. 9. Assuming that the return spring rate in the driven pulley relative to the spring rate in the drive pulley is negligible, input torque can be equated to the torque developed by springs 30. Thus, spring torque in FIG. 8 should be nearly equal to spring torque in FIG. 9.

Knowing the free length of the springs, number of springs, and effective diameter described by the springs, spring torque in FIG. 8 can be equated to spring torque in FIG. 9 and spring design parameters such as spring rate can be determined. It is my experience that the springs need to be as long as possible to provide adequate preload and travel before solid length is realized.

SUMMARY, RAMIFICATIONS, AND SCOPE

Accordingly, the reader will see that the drive system of this invention is simple yet effective in its ability to compensate for applied loads. It has potential for application in numerous machine applications. Further, because a single configuration designed to utilize the resiliency of an entrapped gas has the capability to be easily configured for a wide variety of end users, it is very useful as a bicycle drive.

Although the described figures illustrate V-belt drive means and given shapes for other components, it is recognized that those skilled in the art are capable of producing further embodiments utilizing like arrangements and principles of operation. Thus the scope of the invention should be determined by the appended claims and their legal equivalents, rather than by the examples given.

I claim:

1. A variable diameter pulley with an expansible rim comprising:
   (a) a hub,
   (b) a plurality of belt engaging members,
   (c) linkage means connected to said hub and said belt engaging members,
   (d) resiliently biasing means communicating said belt engaging members with adjacent said belt engaging members on each side.

2. The variable diameter pulley of claim 1 wherein said linkage means is a pivot joint between said hub and each of said belt engaging members whereby said belt engaging members are free to rotate about said pivot joint at said hub.

3. The variable diameter pulley of claim 1 wherein said linkage means comprises a plurality of links, each attached via a first pivot joint at said hub and a second pivot joint at said belt engaging member whereby said belt engaging member is free to rotate about said first pivot joint at said hub and said second pivot joint at said link.

4. The variable diameter pulley of claim 3 wherein said resiliently biasing means is at least one coil spring and a spring guide whereby said spring and said spring guide communicate said belt engaging members to each other such that proper orientation of said belt engaging members is maintained.

5. The variable diameter pulley of claim 3 wherein said belt engaging members communicate directly with adjacent said belt engaging members on each side whereby proper orientation of said belt engaging members is maintained.

6. The variable diameter pulley of claim 5 wherein said resiliently biasing means is a spring.

7. The variable diameter pulley of claim 5 wherein said resiliently biasing means is a gas entrapped between said belt engaging members.

8. An automatically adjusting, load responsive drive system with endless power transmission means functionally connecting a drive variable diameter pulley and a driven variable diameter pulley, each comprising:
   (a) a hub,
   (b) a plurality of belt engaging members,
   (c) linkage means connected to said hub and said belt engaging members,
   (d) resiliently biasing means communicating said belt engaging members with adjacent said belt engaging members.

9. The drive system of claim 8 wherein said endless power transmission means is a V-belt and said belt engaging members have geometry to accept said V-belt.

10. The drive system of claim 8 wherein at least one said variable diameter pulley includes said linkage means comprising a plurality of links attached via a first pivot joint at said hub and a second pivot joint at said belt engaging member whereby said belt engaging member is free to rotate about said first pivot joint at said hub and said second pivot joint at said link.

11. The variable diameter pulley of claim 10 wherein said resiliently biasing means is at least one coil spring and a spring guide whereby said spring and said spring guide communicate said belt engaging members to each other such that proper orientation of said belt engaging members is maintained.

12. The variable diameter pulley of claims 10 wherein said belt engaging members communicate directly with adjacent said belt engaging members on each side whereby proper orientation of said belt engaging members is maintained.

13. The variable diameter pulley of claim 12 wherein said resiliently biasing means is a spring.

14. The variable diameter pulley of claim 12 wherein said resiliently biasing means is a gas entrapped between said belt engaging members.

* * * * *